United States Patent [11] 3,594,088

[72] Inventors Hideaki Akiyama;
 Tadayuki Imai, both of Tokyo, Japan
[21] Appl. No. 794,962
[22] Filed Jan. 29, 1969
[45] Patented July 20, 1971
[73] Assignee Kabushiki Kaisha Ricoh
 Tokyo, Japan
[32] Priority Feb. 10, 1968
[33] Japan
[31] 8296/1968

[54] OPTIMUM OR UNDER OR OVER EXPOSURE-INDICATING DEVICE FOR USE IN PHOTOGRAPHY
2 Claims, 3 Drawing Figs.

[52] U.S. Cl. ..................................... 356/226,
 356/227, 250/210
[51] Int. Cl. ....................................... G01j 1/44,
 G01j 1/42
[50] Field of Search ........................... 356/226,
 227; 250/210

[56] References Cited
UNITED STATES PATENTS
3,436,158 4/1969 Schmitt .................... 336/226
3,452,656 7/1969 Ruhle et al. ............... 95/10
3,489,499 1/1970 Biber ......................... 356/227 X
FOREIGN PATENTS
383,763 1/1963 Switzerland .................. 356/226
1,544,256 9/1968 France ........................ 356/226

Primary Examiner—Ronald L. Wibert
Assistant Examiner—Warren A. Sklar
Attorney—Burgess, Ryan and Hicks ABSTRACT: An optimum or under or over exposure-indicating device for use in photography in which a differential amplifier is actuated in response to the balance or unbalance of a bridge circuit having one arm thereof composed of a photoconductive member for photometry, whereby both or either of two lamps is lighted for indication of optimum or under or over exposure.

INVENTORS
HIDEAKI AKIYAMA
TADAYUKI IMAI
BY
Burgess, Ryan & Hicks,
ATTYS.

OPTIMUM OR UNDER OR OVER EXPOSURE-INDICATING DEVICE FOR USE IN PHOTOGRAPHY

BACKGROUND OF THE INVENTION

The present invention relates to an exposure-indicating device for use in photography and more particularly an optimum or under or over exposure-indicating device for use in photography.

In a conventional pointer-follow-up-type exposure meter attached for example to a camera or a conventional separate exposure meter, a highly sensitive ammeter is employed so that the exposure meter is easily and often susceptible to breakdown due to mechanical impact thereto; and when a subject to be photographed is so dark as to have a light value of the order of LV 3, it is difficult to see the pointer of the ammeter in the viewfinder or upon a graduated scale plate so that the exposure read tends to deviate greatly from the true exposure.

The present invention has therefore its object to eliminate the defects encounted in the conventional exposure meter as described above.

SUMMARY OF THE INVENTION

The device of the present invention is comprising a bridge circuit having arms composed of a photoconductive member for photometry, two variable impedance elements such as variable resistors and a fixed element such as a fixed resistor; a differential amplifier consisting of two amplifying elements such as transistors, the input terminal of one of said amplifying elements being connected to a junction between said photoconductive member and one of said two variable impedance elements of said bridge circuit, the input terminal of the other of said two amplifying elements being connected to a junction between the other of said variable impedance elements and said fixed impedance element; two DC amplifiers each of which is controlled by each of the outputs from said differential amplifier; and two indicating means such as lamps interconnected in each of the output circuits of said DC amplifier circuits respectively.

According to one preferred embodiment of the present invention, both of the two lamps are lighted when the bridge circuit is balance, thus indicating the optimum exposure, while only one of the lamps is lighted when the exposure is over or under, thus indicating the over or under exposure. It is preferable and advantageous to use the lamps illuminating different colored lights in order to facilitate the indication.

The above and other objects, features and advantages of the present invention will become apparent from the following description taken in conjunction with the accompanying drawing.

DESCRIPTION OF PREFERRED EMBODIMENT

Figure 1:
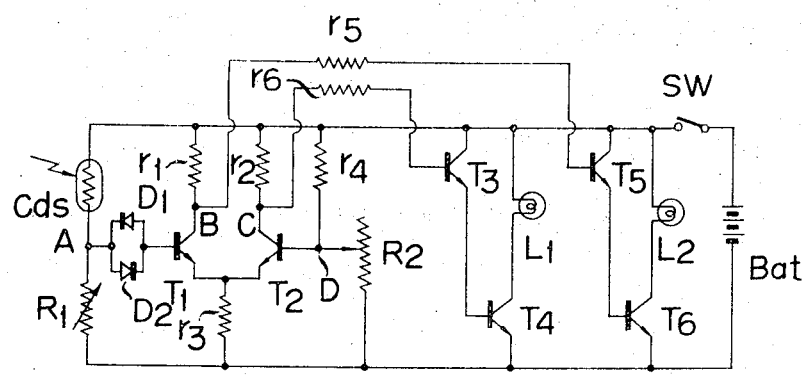
FIG. 1 is a circuit diagram of one embodiment of the present invention.

Referring now to FIG. 1 illustrating one embodiment of a circuitry of a device of the present invention, a variable resistor $R_1$ is interlocked with mechanisms for setting a shutter speed and an ASA sensitivity dial of a camera. The variable resistor $R_1$ is connected in series to a photocell CdS, which may be disposed backwardly of a dove prism in case of a single-lens reflex camera, thus providing the so-called TTL (Through the Lens) system. Another variable resistor $R_2$ is interconnected to 2 aperture-setting mechanism of the camera and is electrically connected in series to a fixed resistor $r_4$ so that a four-arm bridge composed of the CdS photocell, the variable resistor $R_1$, the variable resistor $R_2$ and the fixed resistor $r_4$ is constructed. Transistors $T_1$ and $T_2$ are connected to collector resistors $r_1$ and $r_2$ respectively and are connected to a common emitter resistor $r_3$, thus constructing a differential amplifier. The base electrode of the transistor $T_1$ is connected to the junction A between the photocell CdS and the variable resistor $R_1$ through diodes $D_1$ and $D_2$. The base electrode of the transistor $T_2$ is connected to the junction D between the sliding or moving contact of the variable resistor $R_2$ and the fixed resistor $r_4$. As shown in FIG. 1, the diodes $D_1$ and $D_2$ are connected with reverse polarities so that even when the potential at the junction A, that is the input voltage, is increased or decreased to an extreme degree, the normal operation of the differential amplifier may be maintained by utilizing the reverse current through the diodes $D_1$ and $D_2$.

A DC amplifier consisting of transistors $T_5$ and $T_6$ is connected to the junction B, that is the output terminal of the transistor $T_1$ through a fixed resistor $r_5$ and a lamp $L_2$ is connected to the DC amplifier as load. Another DC amplifier consisting of transistors $T_3$ and $T_4$ is connected to the junction C, that is the output terminal of the transistor $T_2$ through a fixed resistor $r_6$, and as a load thereof is connected thereto a lamp $L_1$. In FIG. 1, reference character Bat. designates batteries; and SW, a power source switch.

Figure 2:
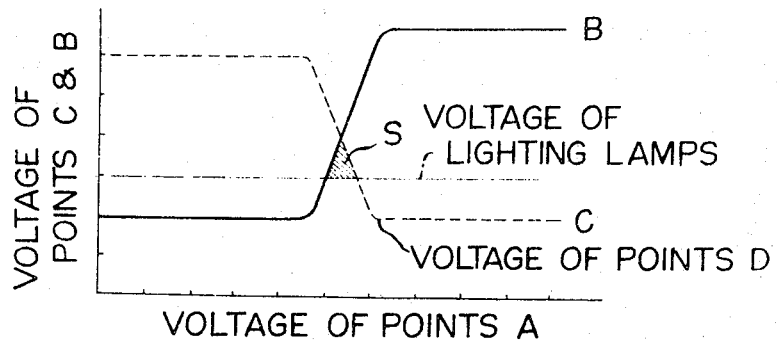
FIG. 2 shows the voltage characteristic curves.

FIG. 2 illustrates characteristic curves representing the relation of potentials at the junctions A, B, C and D. The potentials at the junctions B and C are plotted against the ordinate while that at the junction A is plotted against the abscissa. The solid curve indicates the potential at the junction B while the dotted curve indicates the potential at the junction C. The chain line indicates the potential at which both of the lamps $L_1$ and $L_2$ are lighted. As seen from FIG. 2, the potential 2 the junction B rises very rapidly in the vicinity of the potential at the junction D while the potential at the junction C drops very rapidly.

When upon setting the resistances of the variable resistors $R_1$ and $R_2$ to suitable values the bridge circuit composed of the variable resistors $R_1$ and $R_2$, the fixed resistor $r_4$ and the photocell CdS with the lights being incident thereupon is balanced, the circuit constants are such that the potentials at the junctions B and C are higher than the potential which lights both of the lamps $L_1$ and $L_2$. Furthermore, the bridge is so arranged that even if the bridge is unbalanced to some extent, the lamps $L_1$ and $L_2$ remains lighted. This state is shown by S in FIG. 2.

When the light intensity incident upon the photocell CdS varies, for example, when the intensity is decreased so that the resistance of the photocell is reduced, the bridge circuit is unbalanced so that the current flowing into the base electrode and the collector current of the transistor $T_1$ are both increased. Consequently, potential at the collector electrode, that is potential at the junction B is reduced so that the lamp $L_2$ is turned off. On the other hand, since the current flowing through the emitter resistor $r_3$ is increased, the bias voltage applied to the transistor $T_2$ is reduced so that the base current is reduced, whereby no current flows through the collector thereof. Consequently the collector potential, that is the potential at the junction C is increased. Therefore, both of the transistors $T_3$ and $T_4$ remain still conductive so that the lamp $L_1$ remains lighted. On the other hand, when the intensity of the lights incident upon the photocell CdS is reduced so that the resistance of the photocell is increased, the unbalanced condition of the bridge circuit is reverse to the case described above so that the base current of the transistor $T_2$ is increased and the collector potential thereof, that is the potential at the junction C is reduced, whereby the lamp $L_1$ is turned off and the collector potential of the transistor $T_1$, that is the potential at the junction B is increased. Consequently, the transistors $T_5$ and $T_6$ remain still conductive so that the light $L_2$ remains lighted. Thus, when either of the lamps $L_1$ or $L_2$ is lighted, the optimum exposure can be attained by adjusting the resistances of the variable resistors $R_1$ and $R_2$ so as to light both of the lamps 1 7 and $L_2$.

In the present embodiment, the lamps $L_1$ and $L_2$ illuminate different colored lights and one of them is used to indicate the "overexposure"while the other, to indicate the "underexposure". Therefore, when the optimum exposure is attained and both of the lights are lighted as described above, the illumination whose color is different from those of the lamps $L_1$ and $L_2$ is obtained. But the present invention is not limited thereto, but any other marking or coloring method can be employed to indicate the optimum exposure by both of the lamps. For example, the lamps may be marked with arrows.

Figure 3:
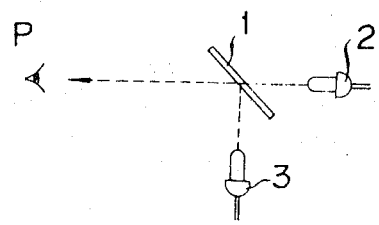
FIG. 3 is an explanatory view illustrating one embodiment of an indicating portion of the device of the present invention.

FIG. 3 illustrates one embodiment for indicating the optimum exposure by the lamps. A half-mirror 1 and lamps 2 and 3 are arranged as shown in FIG. 3 in such a manner that when the half-mirror 1 is viewed from a point P, either or both of lighted lamps 2 or/and 3 may be seen. When both of the lamps are lighted, the lights from both lamps are superposed one upon the other at the half-mirror 1 so that it is preferable in this embodiment to use different types of lamps which illuminate different colored lights.

From the description above, it is apparent that the present invention eliminates the use of a conventional exposure measurement device of the type in which an ammeter which tends to lead to failure of function is used; the state of exposure, that is whether the exposure is "under or over" can be directly read by the device of the present invention employing a simple circuit; the positive exposure reading can be made even if the environment is dark; and the measurement of the light with the taking lens being left wide opened can be made when the device of the present invention is incorporated in a camera in such a manner that one of the variable resistors is interlocked with the aperture control.

The present invention has been so far described in detail with particular reference to preferred embodiments thereof, but it will be understood that variations and modifications can be effected without departing the true spirit of the present invention as described hereinabove and as defined in the appended claims.

We claim:

1. An optimum or under or over exposure-indicating device for use with a power source in photography, said device comprising:

a bridge circuit having four series-connected arms, with two arms thereof each including a variable impedance element, with one arm thereof including a fixed impedance element and with the remaining arm thereof including a photoconductive member having an impedance related to the incident light thereon, a differential amplifier comprising two amplifying elements and having first and second input terminals and first and second out terminals respectively, said first input terminal being connected to a junction between the arms of said bridge containing said photoconductive member and one of said variable impedance elements, Said second input terminal being connected to a junction between the arms of said bridge, containing said fixed impedance element and the other of said variable impedance elements, the remaining junctions between the arms of said bridge being connectable to said power source, a first amplifier connected to said first output terminal and controlled thereby, a second amplifier connected to said second output terminal and controlled thereby, a first lamp connected in an output circuit of said first amplifier for energization therefrom, and a second lamp connected in an output circuit of said second amplifier for energization therefrom, said first and second lamps both being concurrently energized when said bridge is substantially balanced to indicate an optimum exposure range whereas only one of said first and second lamps is energized to indicate under or over exposure conditions.

2. A device as in claim 1 further comprising:

means for causing the light emanating from said first lamp to comprise one color, and means for causing the light emanating from said second lamp to comprise another different color.